United States Patent [19]

Bender et al.

[11] Patent Number: 4,920,619
[45] Date of Patent: May 1, 1990

[54] SAFETY BELT WITH INTEGRATED LOCK RELEASE

[75] Inventors: Richard Bender, Lauf; Anton Bretfeld, Fürth, both of Fed. Rep. of Germany

[73] Assignee: Dynamit Nobel Aktiengesellschaft, Troisdorf, Fed. Rep. of Germany

[21] Appl. No.: 406,553

[22] Filed: Sep. 13, 1989

[30] Foreign Application Priority Data

Sep. 13, 1988 [DE] Fed. Rep. of Germany ....... 3831145

[51] Int. Cl.⁵ ............................................. A44B 11/25
[52] U.S. Cl. .......................................... 24/602; 24/603
[58] Field of Search .............. 24/602, 603, 682, 265 R

[56] References Cited

U.S. PATENT DOCUMENTS

| | | | |
|---|---|---|---|
| 4,086,685 | 5/1978 | Gaylord | 24/603 |
| 4,644,616 | 2/1987 | Ferry | 24/603 |
| 4,715,096 | 12/1987 | Fleming et al. | 24/602 |

FOREIGN PATENT DOCUMENTS 2345593  3/1974  Fed. Rep. of Germany ........ 24/602

Primary Examiner—Victor Sakran
Attorney, Agent, or Firm—Antonelli, Terry & Wands

[57] ABSTRACT

A pin of a retracting or ejecting pyrotechnical power element preferably mounted on the side of a belt lock facing away from the engaged belt is connected to a trigger key in such a way that, upon initiation of the charge of the pyrotechnical power element as a result of a threshold of a sensor in the vehicle being exceeded, due to an occurrence to be sensed, i.e. an impact upon collision and, after a required delay, the trigger key is depressed completely—and remains depressed. The required delay between the occurrence and the instant of belt separation can be effected electronically or, quite especially preferably, integrated in the pyrotechnical power element by means of a pyrotechnical transmission path.

4 Claims, 3 Drawing Sheets

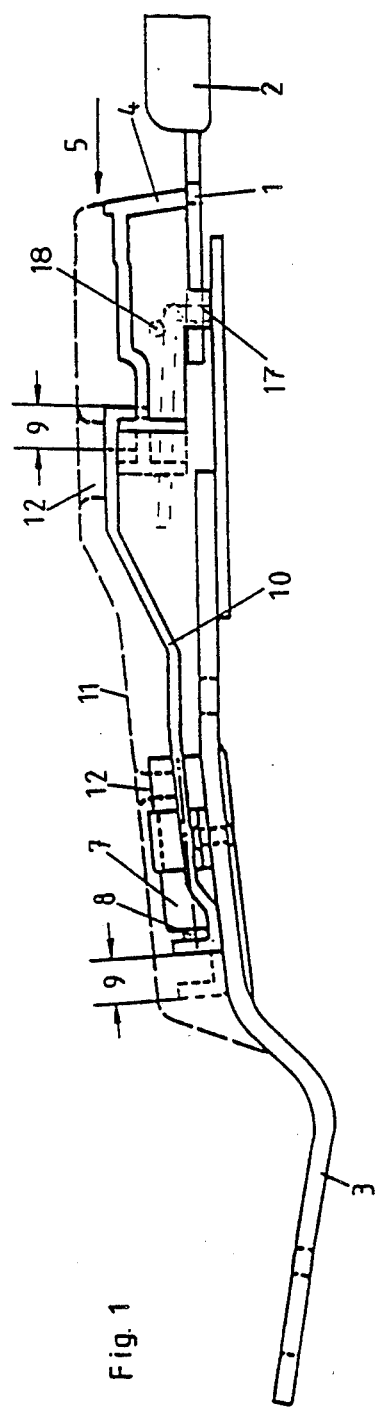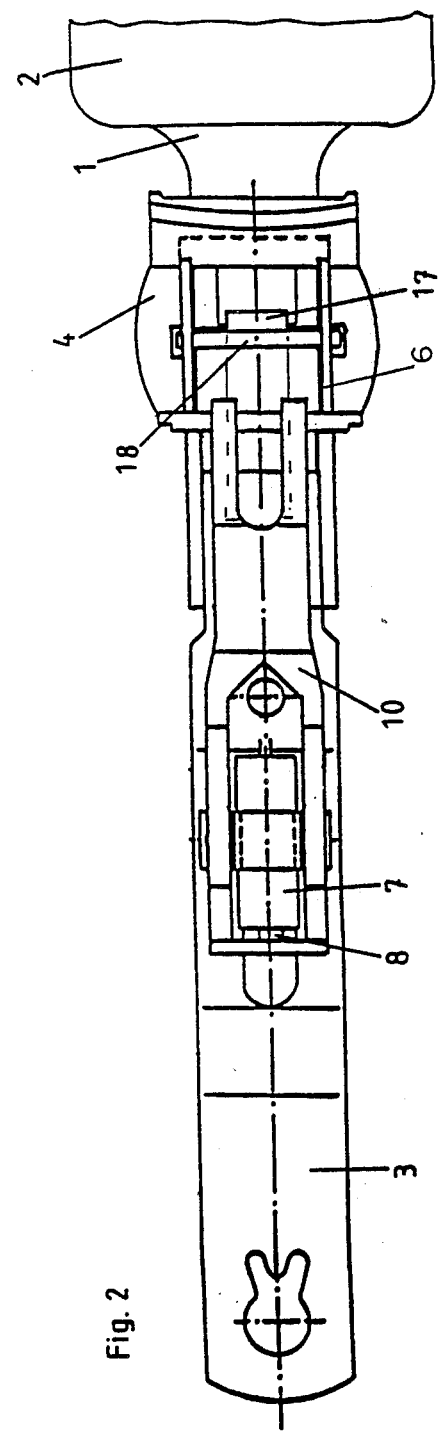
Fig. 1
Fig. 2

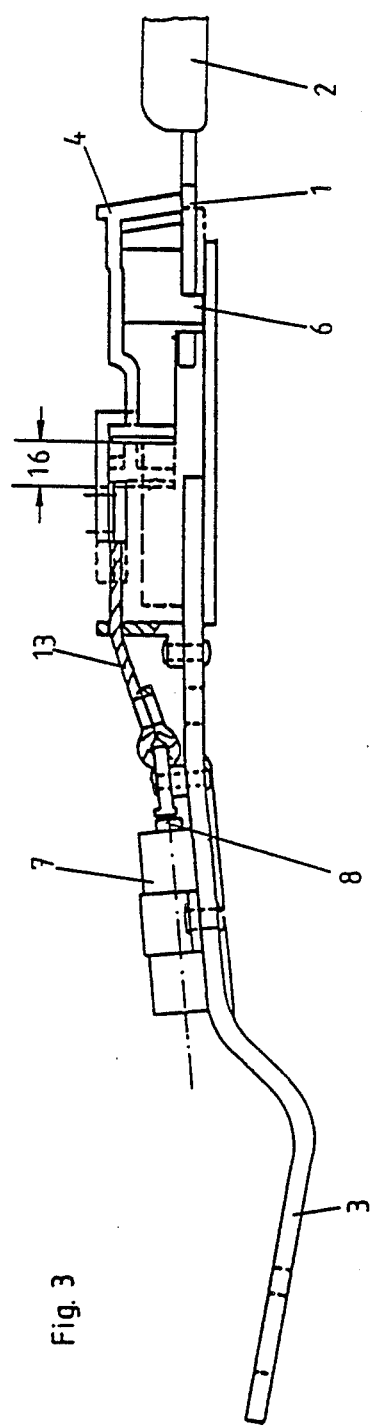
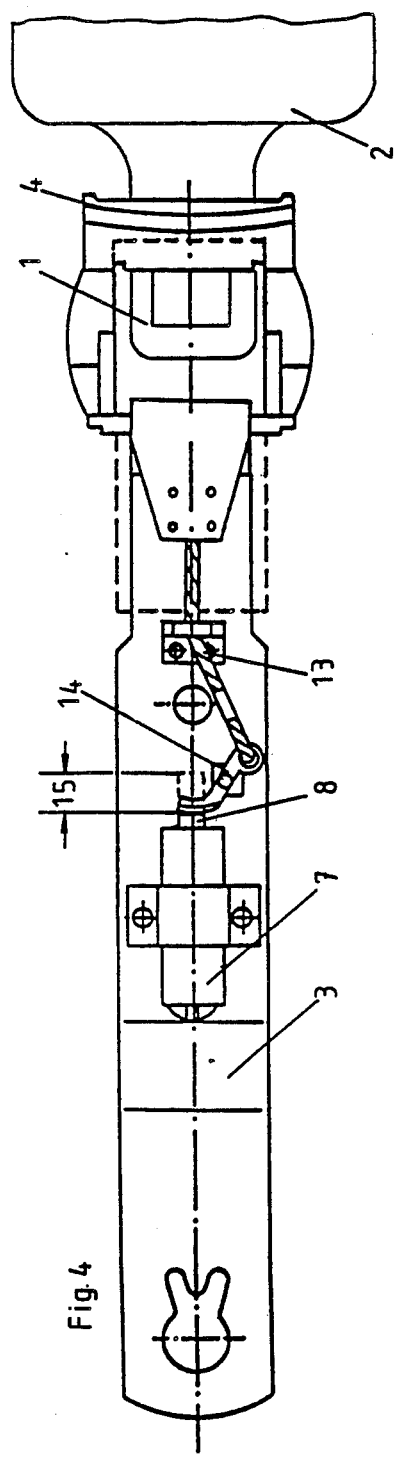
Fig. 3
Fig. 4

SAFETY BELT WITH INTEGRATED LOCK RELEASE

BACKGROUND OF THE INVENTION

The invention is directed to a safety belt arrangement for passengers in a vehicle, containing a lock attachable to the vehicle for accommodating a belt provided with a lock plate wherein, by depressing a trigger key at the lock, a shape-mating connection of the lock plate with the lock is released, in conjunction with a belt lock release containing a sensor, a delay device, and a pyrotechnical power element with an electrical igniter and an axially movable pin.

The use of a pyrotechnical device for the automatic release of a belt system has been known from U.S. Pat. No. 4,086,685.

Specific embodiments for a safety belt system for vehicles can be derived from French No. A-2,507,864 and French No. A-2,442,163.

In all these devices, retrofitting work must be performed on the lock; also, in most cases the external dimensions and the operability are altered by the additionally installed elements; the power consumption as well as the space requirement are considerable.

SUMMARY OF THE INVENTION

It is an object of the invention to provide an inexpensive safe belt lock release for commercially available seat systems in vehicles, without performing complicated alterations on the locking mechanism of the seat belt consumption.

This object has been attained by a safety belt device of the type hereinabove described which is characterized in that a pin of a pyrotechnical power element is connected to a trigger key of the lock or locking mechanism by way of a connecting member in such a way that the movement of the pin of the pyrotechnical power element, triggered by ignition caused by activation of a sensor in the vehicle, results in the complete depression of the trigger key, and the depression of the trigger key by hand remains possible without hinderance.

This arrangement achieves the objective that the trigger key is automatically actuated after an adjustable time period on the order of 10 seconds after an occurrence when a sensor transmits a value lying above a threshold, and a lock of a seat belt system is thus opened. This will occur even in such a case where parts of the lock may already be bent out of shape, because it is possible to generate forces by means of a pyrotechnical power element which are higher than thumb pressure, and safety belt locks are constructed so that they open up as soon as the shape-mating locking action is eliminated.

It is possible to provide an electronic delay means between the sensor and the igniter element of the pyrotechnical power element, or a pyrotechnical delay path can be installed in the pyrotechnical power element between the igniter charge and the propellant charge of the pyrotechnical power element. Depending on the way that the connecting member between the pin of the pyrotechnical power element and the trigger key is designed, retracting or ejecting power elements can be utilized. One must, however, ensure that, upon initiation of the pyrotechnical power element, the trigger key is depressed and that upon manual depression of the trigger key, the pin of the pyrotechnical power element is not moved.

BRIEF DESCRIPTION OF THE DRAWINGS

The arrangement of the present invention is illustrated in the accompanying drawings and is described hereinafter by way of preferred embodiments. In the drawings:

FIG. 1 is a side view of a belt lock with a rigid connecting member between a trigger key and a pyrotechnical power element;

FIG. 2 is a top view of a belt lock as shown in FIG. 1, without a housing;

FIG. 3 is a side view of a belt lock with a cable between a trigger key and a pyrotechnical power element, without a housing;

FIG. 4 is a top view of a belt lock as shown in FIG. 3;

Figure 5:
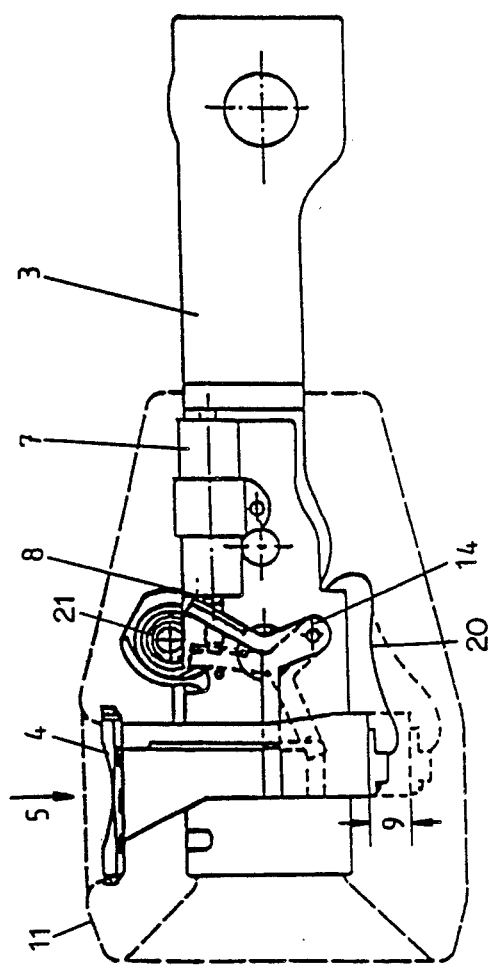
FIG. 5 is a top view of a belt lock wherein the direction of movement for actuating a trigger key is oriented perpendicularly to a lock plate.
Figure 5:
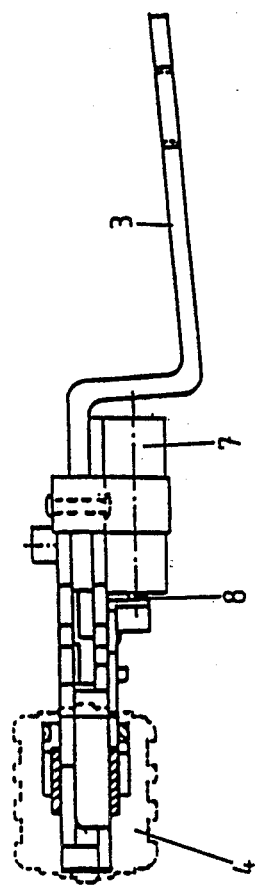

The three different embodiments hereinafter described are to show by way of example that the present invention can be put into practice in various ways and can be adapted to varying types of locks of conventional seat belt systems. With the belt lock according to FIGS. 1 and 2, most popular at present, the direction of movement 5 for activating the belt release key 4 coincides with the way in which the lock plate 1, suspended via a loop 2 on a portion of the belt, must be attached, for putting the belt on, to the belt lock hanging at the end of a belt thong 3. Such a lock comprises a locking pin 17 establishing in the locked condition, a shape-mating connection between the lock plate 1 and the belt thong 3. Upon depressing the trigger key 4, the bolt 18 within a recess, not shown, on the wall 6 of the lock is moved so that the locking pin 17 can escape, supported by a spring, toward the bolt, and a movable bracket, likewise not illustrated, is flipped over, resulting in jumping of the plate 1 out of the lock.

A pyrotechnical power element 7 wherein, after initiation of a charge producing pressurized gas, a pin 8 is ejected by a distance 9, is attached to the belt thong 3 on the opposite side of the lock into which the lock plate 1 is inserted. In this embodiment, the connecting member 10 between the pyrotechnical power element 7 and the trigger key 4 is rigid. A specialty according t this invention resides in the claw-like connection of the connecting member 10 with the trigger key 4. This ensures immobility of the connecting member during everyday usage of the belt, but when the pyrotechnical power element 7 responds, the trigger key 4 is in any event retracted by the full distance 9, resulting in the aforedescribed separation of the belt.

The lock is covered by a housing 11. It can be seen that the exterior of the housing covering the lock has been altered just slightly, or not at all. A vehicle operator will not recognize whether he applies a conventional safety belt or whether the system contains a belt lock release in accordance with this invention. The connecting member 10 is guided along the housing 11 by strips 12. In this example, the path length 9 of the pin 8 must correspond to the keying depth of the trigger key (about 7–9 mm).

Independently of the position of the trigger key 4, an occurrence, e.g. an impact due to a crash, recorded by a sensor (not shown in the figure; for example, an acceleration sensor as disclosed in DE-A-2,207,831) which is determined to be above a threshold value, has the result that the pin 8 of the pyrotechnical power element 7 will be completely extended, and also remains in this extended position. Thus, the lock can no longer click back into place. There is normally no need for a special device for retaining the pin of the pyrotechnical power element in its final position after initiation of the pyrotechnical power element since in the great majority of pyrotechnical power elements, on account of their structure (described, for example in DE-C-1,646,335), the pin, after an initiation, can no longer be moved a second time, by means of a knurled section and/or slack and/or residual gas pressure. In case of an electronic delay device between the sensor and the igniter element, initiation of the pyrotechnical power element will directly result in ejection of the pin 8. In case the delay device is integrated, as a pyrotechnical power element, no separate current source is required, and in inexpensive, compact element rather accurate for the required time period has been created.

FIG. 2 shows the top view of a lock according to FIG. 1.

FIGS. 3 and 4 show a belt lock similar to that shown in FIGS. 1 and 2. The difference resides in the transmission of the movement from the pyrotechnical power element to the trigger key. Components of identical function as the embodiment shown in FIGS. 1 and 2 bear the same reference symbols. The connecting member, of rigid design in FIGS. 1 and 2, is in this case provided by a cable 13. Upon actuation of the pyrotechnical power element 7, the pin 8 is in this arrangement ejected out of the pyrotechnical power element toward the lock plate 1 by a distance 15. On account of a lever 14, this movement is translated into a tensile force on the cable 13, the movement 15 of the piston 8 and the lever size being adapted to the required movement 16 of the trigger key 4. The housing cover has been omitted in these figures.

The cable 13 is fixedly connected to the trigger key 4. On account of the resiliency of the cable 13, no forces are transmitted to the pin 8 of the pyrotechnical power element 7 upon depression of the trigger key 4; whereas, upon initiation of the pyrotechnical power element 7 the trigger key 4 is completely depressed and remains so.

Figure 6:
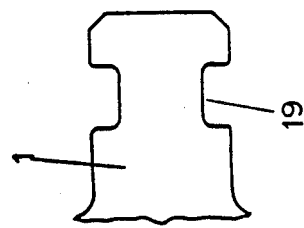
FIG. 6 is a side view of a belt lock shown in FIG. 5, without a housing.
Figure 6:
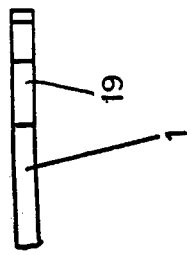

A different type of a safety belt lock, known per se, is illustrated in FIGS. 5 and 6 wherein the trigger key 4 can be operated perpendicularly to the tensioning device of the belt. In place of a central aperture in the lock plate 1, this arrangement includes a pair of rolls which, in the locked condition, engages laterally at a corresponding recesses 19 on the lock plate 1. The pair of rolls is urged against the lock plate 1 by one end 20 of the spiral spring 21. The other end of the spiral spring cooperates with an ejector (not shown) which forces the lock plate 1 out of the lock as soon as the shape-mating connection has been abolished by pressing the trigger key 4 in direction 5. Transmission of the movement of piston 8 to the trigger key 4 here also takes place via a lever 14 wherein the connection of piston 8 to lever 14 is such that upon actuation of the trigger key the lever 14 is rotated without movement of the piston 8; whereas, upon ejection of the piston 8 from the pyrotechnical power element 7 the key 4 is in all cases depressed to a stop (not shown) and—remains in this position. This end position is indicated in FIG. 5 in dashed lines for the lever 14 as well as the end of spiral spring 21 and the bottom zone of the trigger key 4.

What is claimed is:

1. A safety belt device in a vehicle which comprises a lock attachable to the vehicle for accommodation of a belt provided with a lock plate wherein, by depression of a trigger key at the lock, a shape-mating connection of the lock plate with the lock is released, and a belt lock release containing a sensor, a delay device, and a pyrotechnical power element with an electrical igniter and an axially movable pin; the pin of the pyrotechnical power element being connected to the trigger key by way of a connecting member in such a way that movement of the pin of the pyrotechnical power element, triggered by ignition, results in the complete depression of the trigger key and the depression of the trigger key by hand remains possible without hinderance.

2. A safety belt device in a vehicle according to claim 1, wherein the delay device is an electronic device.

3. A safety belt device in a vehicle according to claim 1, wherein the delay device is a pyrotechnical delay device operatively associated with said pyrotechnical power element.

4. A safety belt device in a vehicle according to claim 1 wherein the pin of the pyrotechnical power element remains, after initiation, in its final position.

* * * * *